J. HALTENBERGER.
DOUBLE PISTON INTERNAL COMBUSTION ENGINE.
APPLICATION FILED FEB. 13, 1914.
1,199,068.
Patented Sept. 26, 1916.
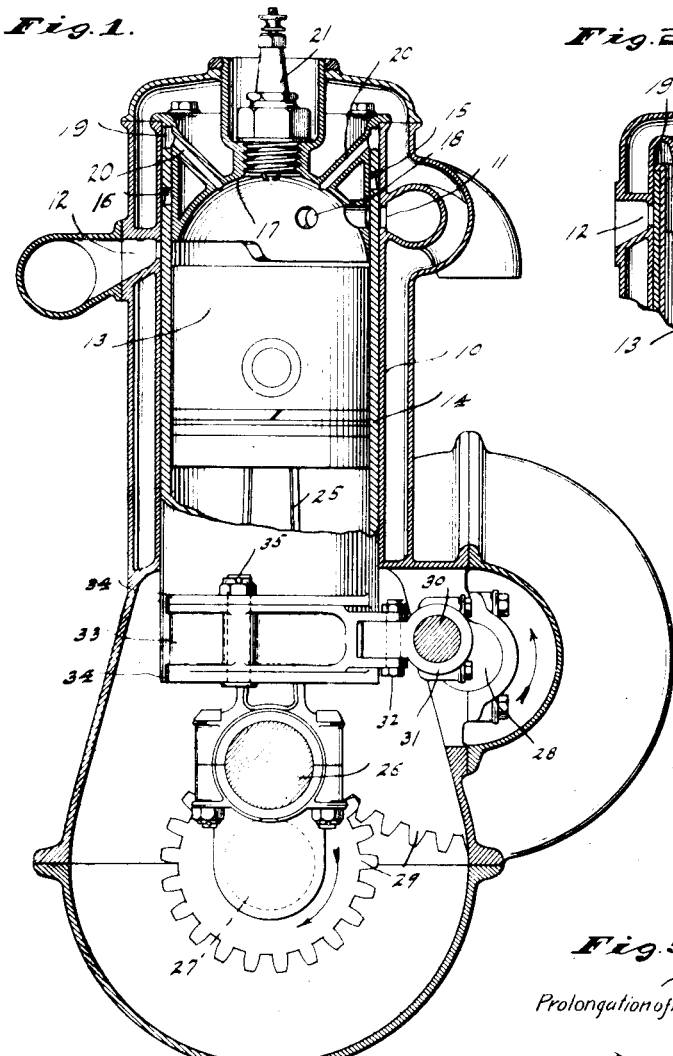
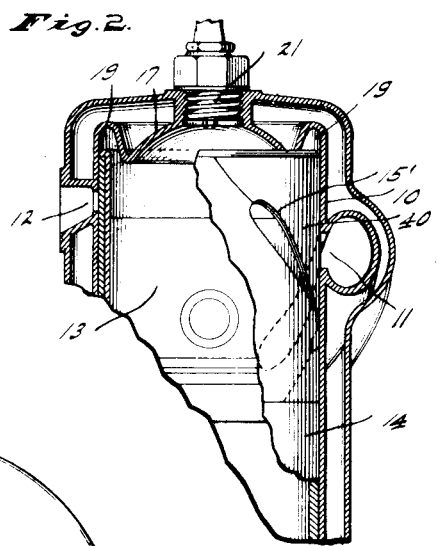
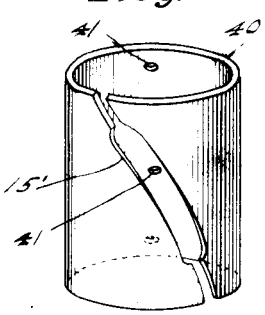
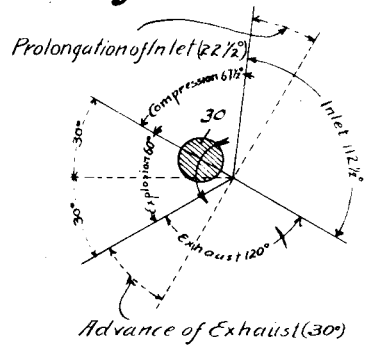
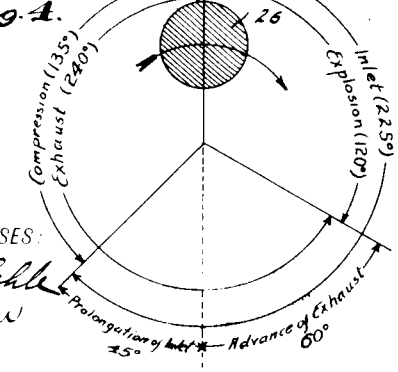
WITNESSES:
Frank A. Fahl
May Layden
INVENTOR
Jules Haltenberger,
BY
Arthur M. Hood
ATTORNEY

UNITED STATES PATENT OFFICE.

JULES HALTENBERGER, OF INDIANAPOLIS, INDIANA, ASSIGNOR TO MID-WEST EQUIPMENT COMPANY, OF INDIANAPOLIS, INDIANA, A CORPORATION OF DELAWARE.

DOUBLE-PISTON INTERNAL-COMBUSTION ENGINE.

1,199,068.  Specification of Letters Patent.  Patented Sept. 26, 1916.

Application filed February 13, 1914. Serial No. 818,507.

*To all whom it may concern:*

Be it known that I, JULES HALTENBERGER, a citizen of Hungary, residing at Indianapolis, in the county of Marion and State of Indiana, have invented a new and useful Double - Piston Internal - Combustion Engine, of which the following is a specification.

It is the object of my invention to increase the efficiency of internal combustion engines, especially high speed engines of the sleeve valve type. To this end, fundamentally, I provide a second or supplementary piston, which is preferably a tubular or cylindrical shell and is interposed between the main piston and the cylinder and serves also as a sleeve valve, and interconnect the main piston and the supplementary piston so that the latter makes one-half the number of reciprocations of the former and moves during the explosion period of the engine at the most advantageous part of its movement for transforming the force of the explosion into motion.

I have illustrated my invention as applied to a high speed engine in which there is but a single supplementary piston, which also serves as a sleeve valve, though it is obvious that this is merely one illustrative embodiment of my invention.

The accompanying drawing illustrates my invention.

Figure 1 is a longitudinal section, with some parts in elevation, through a cylinder of a high speed internal combustion engine embodying one form of my invention; Fig. 2 is a longitudinal section through a cylinder of an engine embodying a modified form of my invention; Fig. 3 is a perspective view of a piston ring used in connection with the supplementary piston in the form of engine shown in Fig. 2; Fig. 4 is a diagram showing the cycle of operations for the crank shaft; and Fig. 5 is a similar diagram showing the corresponding cycle of operations for the supplementary piston and the supplementary piston shaft.

In the arrangement shown in Fig. 1, the cylinder 10, shown as water-jacketed, is provided with an inlet port or ports 11 and an exhaust port 12, and reciprocable within this cylinder 10 is a main piston 13. A second or supplementary piston 14, in the form of a cylindrical shell, is interposed between the inner surface of the cylinder 10 and the outer surface of the piston 13, and is provided with one or more inlet ports 15 and an exhaust port 16 which coöperate respectively with the inlet port or ports 11 and the exhaust port 12 of the cylinder, so that the supplementary piston also serves, in this case, as a sleeve valve. The cylinder 10 is provided with a cylinder head 17 which extends downward within the cylinder and fits against the inner surface of the supplementary piston 14, this depressed cylinder head being provided with one or more ports 18 in radial alinement with the ports 11, so that when the ports 15 do not register with the ports 11 the closure is a double one. In this form of my invention, the inlet ports 11 and 18 are in a higher horizontal plane than is the exhaust port 12, the latter being sufficiently low so that it is below the lower end of the depressed cylinder head 17. Thus the upper end of the supplementary piston 14 extends up into an annular space 19 formed by the cylinder 10 and its depressed cylinder head, and this space is connected with the space within the cylinder by one or more ports 20 extending through the cylinder head diagonally and communicating with the annular space 19 at a point higher than the highest point reached by the upper end of the supplementary piston 14. The cylinder head 17 is provided with the usual spark plug 21.

The piston 13 is connected by a pitman 25 to an eccentric portion 26 of the crank shaft 27 of the engine. The crank shaft 27 is connected to a supplementary-piston shaft 28 by gearing 29, shown as intermeshing spur gears, of the proper gear ratio to produce one rotation of the shaft 28 for every two rotations of the shaft 27. The shaft 28 is provided with an eccentric portion 30, for each cylinder of the engine if the engine is a multi-cylinder engine, and this eccentric portion 30 carries a collar 31 within which said eccentric portion can rotate. Pivoted to this collar 31 on a pivot bolt 32 transverse to the axis of the shaft 28 is an arm 33, which fits between two flanges 34 projecting laterally from the supplementary piston 14, the arm 33 being pivoted to these flanges 34 on a pivot bolt 35 parallel to the bolt 32 and transverse to the flanges 34. This connection constrains the movement of the arm 33 relative to the supplementary piston 14 to be in a plane parallel to the flanges 34 and about the pivot bolt 35 as a center, so that as the shaft 28 is rotated the supplementary piston 14 is caused to move both axially and circumferentially in a closed path of one loop which is nearly circular in form. Either the axial or the circumferential component of this movement is substantially in accordance with the law of sines. By reason of the two to one gearing 29 the movement in this path is completed once in each two revolutions of the crank shaft 27. The ports 15 and 16 are caused to coöperate with the ports 11 and 18, and 12, respectively, as the supplementary piston 14 moves in this path, and to do so at the proper times to admit the explosive mixture of the space within the cylinder and to allow the burnt gases to escape from the cylinder at the proper times in the cycle of operations, no attempt being made to show the exact location of the ports 15 and 16 circumferentially of the supplementary piston 14.

The parts are shown in the relative positions which they occupy at the beginning of the explosion period of the engine. This explosion period is considered as beginning at the highest point of the compressing movement of the piston 13, and as ending when the exhaust opens, at which latter time the force of the explosion on the piston terminates. This opening of the exhaust is before the piston 13 reaches the end of its downward stroke, and in high speed engines this opening of the exhaust may occur as much as 60° before the crank shaft 27 reaches its lowermost position, so that the explosion period is 120° of crank shaft movement, as illustrated in Fig. 4. During this 120° of crank shaft movement the entire power from the explosion must be obtained; this angle varies, of course, in different engines. The exhaust will thus be open during approximately 240° of crank shaft movement, in this case, in order to allow sufficient time for exhaust. Similarly, the inlet, which is opened about the time of the closure of the exhaust, will remain open until the crank 26 has passed its lowest position, in order to permit more complete filling of the cylinders with the explosive mixture on high speed; in the diagram this prolongation of the inlet opening is assumed to be 45°. This leaves 135° for the compression period. These angles are merely by way of example, of course, and will be varied very considerably in different engines. The corresponding movements of the valve shaft 28, its crank or eccentric portion 30, and in substance any point on the supplementary piston 14, are illustrated in Fig. 5, the explosion period being considered as the time from the beginning of the downward stroke of the piston 13 under explosion to the time when the exhaust is opened, the exhaust period from the time of the opening of the exhaust until the completion of the upward exhaust movement of the piston 13, the inlet period as the period from the beginning of the downward inlet stroke until the closing of the inlet, and the compression period as the time from the closing of the inlet until the completion of the upward stroke of the piston 13 just previous to explosion. Preferably, the movement of the supplementary piston 14 during the explosion period is equally above and below the center of the axial component of such movement, so that such axial component during this explosion period will be the greatest possible and the circumferential component the least possible for that angle; in other words, such axial component will be at the steepest descending part of the sine curve expressing the law of such axial component. With the angles as given above for the crank shaft 27, the eccentric portion 30 at the beginning of the explosion period will be 30° above the horizontal on its downward stroke, as illustrated, the total movement of the eccentric 30 during the explosion period being 60°. By this arrangement, the force of the explosion within the cylinder, which force is transmitted downward against the upper surface of the piston 13 and also against the upper surface of the supplementary piston 14, is transmitted from the main piston 13 through the pitman 25 directly to the crank shaft 27, and from the supplementary piston 14 through the flanges 34, the arm 33, the collar 31, the supplementary piston shaft 28, and the gearing 29 to such crank shaft 27, and the movement of the supplementary piston 14 is the greatest possible for the angle corresponding to the explosion period, in the illustrative case given being one-half the total axial movement of said second piston. By reason of the action of the explosion against the upper surface of the supplementary piston 14, and the resultant transmission of the force thereof to the crank shaft 27, the efficiency of the engine is materially increased, because more complete expansion is obtained with the same advance of exhaust necessary for the complete exhaustion of the burnt gases on high speed.

In the arrangement shown in Fig. 2, the cylinder 10, the inlet and exhaust ports 11 and 12, the piston 13, the second or supplementary piston 14, the inlet port 15, the depressed cylinder head 17, and the spark plug 21 are provided as before, but the inlet port 11 is arranged in a lower horizontal plane than the exhaust port 12, instead of in a higher horizontal plane as in the arrangement shown in Fig. 1, the exhaust port 16 is omitted and the exhaust allowed to be over the upper end of the supplementary piston 14, the depressed piston head 17 is spaced from the inner surface of the supplementary piston 14 to provide a complete annular communication between the annular space 19 and the space within the cylinder, and the supplementary piston 14 is provided with a piston ring 40 to insure tight joints. This piston ring is shown in perspective in Fig. 3, being split, preferably diagonally, to allow expansion, being provided with a port 15' to correspond with the inlet port 15 in the supplementary piston 14 proper, and being prevented from relative rotation on the supplementary piston 14 by means of pins which pass through holes 41 in the ring 40 and into or through the piston 14. The relative timing of the main piston 13 and supplementary piston 14 is substantially the same as in the arrangement shown in Fig. 1, the ports 15 and 15', in the supplementary piston 14 and its piston ring 40 being so located that they will register with the inlet port or ports 11 of the cylinder 10 during the inlet period of the cycle of operation. In the arrangement shown in Fig. 2, as in the arrangement shown in Fig. 1, the force of the explosion within the cylinder is partly against the upper surface of the supplementary piston 14, and the force of such explosion is transmitted, by the same or equivalent connections as shown in Fig. 1, from such piston 14 to the crank shaft 27 to assist the main piston 13 in driving such crank shaft.

I claim as my invention:

1. An internal combustion engine, comprising a cylinder, a main piston reciprocable therein, a supplementary piston interposed between the main piston and the cylinder and also reciprocable in said cylinder, said second piston being geared to the main piston to make one complete reciprocation for two complete reciprocations of the main piston and also to have a circumferential movement, said cylinder being provided with ports which are covered and uncovered by the movement of said supplementary piston and the end surface of said supplementary piston being open to the space within the cylinder so that the said supplementary piston as well as the main piston is acted on by the force of the explosion within the cylinder.

2. An internal combustion engine, comprising a cylinder, a main piston reciprocable therein, a supplementary piston also reciprocable in said cylinder, said second piston being geared to the main piston to make one complete reciprocation for two complete reciprocations of the main piston and also to have a circumferential movement, said cylinder being provided with ports which are covered and uncovered by the movement of said supplementary piston and the end surface of said supplementary piston being open to the space within the cylinder so that the said supplementary piston as well as the main piston is acted on by the force of the explosion within the cylinder.

3. An internal combustion engine, comprising a cylinder, a main piston reciprocable therein, a supplementary piston interposed between the main piston and the cylinder and also reciprocable in said cylinder, and connections between said supplementary piston and the main piston to cause said supplementary piston to make one complete reciprocation for two complete reciprocations of the main piston, the end surface of said supplementary piston being open to the space within the cylinder so that the supplementary piston as well as the main piston is acted on by the force of explosions within the cylinder, said connections causing the axial movement of said supplementary piston to be substantially in accordance with the law of sines and the part of such movement during the explosion period of the engine to be in substantially the steepest part of the sine curve.

4. An internal combustion engine, comprising a cylinder, a main piston reciprocable therein, a supplementary piston also reciprocable in said cylinder, and connections between said second piston and the main piston to cause said second piston to make one complete reciprocation for two complete reciprocations of the main piston, the end surface of said supplementary piston being open to the space within the cylinder so that the said supplementary piston as well as the main piston is acted on by the force of the explosion within the cylinder, and said connections causing the axial movement of said second piston to be substantially in accordance with the law of sines and the part of such movement during the explosion period of the engine being at substantially the steepest part of the sine curve.

5. An internal combustion engine, comprising a cylinder, a main piston reciprocable therein, a crank shaft connected to said piston, a supplementary piston interposed between said first piston and said cylinder and movable relatively to the cylinder, said cylinder being provided with ports which are covered and uncovered by such movement of said supplementary piston, a shaft geared to said crank shaft to rotate at half the speed of the latter, said second shaft having an eccentric portion and a connection between said eccentric portion and said supplementary piston for constraining the latter to move both axially and circumferentially, the end of said supplementary piston being exposed to the force of explosions within the cylinder.

6. An internal combustion engine, comprising a cylinder, a main piston reciprocable therein, a crank shaft connected to said piston, a supplementary piston movable relatively to the cylinder, said cylinder being provided with ports which are covered and uncovered by such movement of said supplementary piston, a shaft geared to said crank shaft to rotate at half the speed of the latter, said second shaft having an eccentric portion, and a connection between said eccentric portion and said supplementary piston for constraining the latter to move both axially and circumferentially, the end of said supplementary piston being exposed to the force of explosions within the cylinder.

7. An internal combustion engine, comprising a cylinder, a main piston reciprocable therein, a crank shaft connected to said piston, a unitary supplementary piston interposed between said first piston and said cylinder and movable relatively to the cylinder, said cylinder being provided with inlet and exhaust ports, and said supplementary piston being cut away so that by its movements it can cover both the inlet and the exhaust ports nonsynchronously but not synchronously and can uncover them nonsynchronously but not synchronously, a shaft geared to said crank shaft to rotate at half the speed of the latter, said second shaft having an eccentric portion, and a connection between said eccentric portion and said supplementary piston for constraining the latter to move axially and in its movements to cover said ports nonsynchnonously and to uncover them nonsynchronously, the end of said supplementary piston being exposed to the force of explosions within the cylinder.

8. An internal combustion engine, comprising a cylinder, a main piston reciprocable therein, a crank shaft connected to said piston, a unitary supplementary piston movable relatively to the cylinder, said cylinder being provided with inlet and exhaust ports, and said supplementary piston being cut away so that by its movements it can cover both the inlet and the exhaust ports nonsynchronously but not synchronously and can uncover them nonsynchronously but not synchronously, a shaft geared to said crank shaft to rotate at half the speed of the latter, said second shaft having an eccentric portion, and a connection between said eccentric portion and said supplementary piston for constraining the latter to move axially and in its movements to cover said ports nonsynchronously and to uncover them nonsynchronously, the end of said supplementary piston being exposed to the force of explosions within the cylinder.

9. In an internal combustion engine, the combination of a fixed cylinder provided with inlet and exhaust ports, a head fixed to said cylinder and projecting thereinto and being spaced from the inner wall thereof, a second cylinder slidable within said first cylinder and telescoping with said head, the space between the end of said second cylinder and said head communicating with the space within said second cylinder, a piston working within said second cylinder, a crank shaft to which said piston is connected, and means operatively connecting said second cylinder with said crank shaft for constraining the former to move both circumferentially and axially in a definite cycle relative to the movements of the piston to control such ports and for transmitting to said crank shaft the force of explosions against the end of said second cylinder.

10. In an internal combustion engine, the combination of a fixed cylinder provided with inlet and exhaust ports, a head fixed to said cylinder, a second cylinder slidable within said first cylinder, the space between the end of said second cylinder and said head communicating with the space within said second cylinder, a piston working within said second cylinder, a crank shaft to which said piston is connected, and means operatively connecting said second cylinder with said crank shaft for constraining the former to move both circumferentially and axially in a definite cycle relative to the movements of the piston to control such ports and for transmitting to said crank shaft the force of explosions against the end of said second cylinder.

11. In an internal combustion engine, the combination of a fixed cylinder provided with inlet and exhaust ports, a head fixed to said cylinder, a second cylinder slidable within said first cylinder, the space between the end of said second cylinder and said head communicating with the space within said second cylinder, a piston working within said second cylinder, a crank shaft to which said piston is connected, means operatively connecting said second cylinder with said crank shaft for constraining the former to move in a definite cycle relative to the movements of the piston and for transmitting to said crank shaft the force of explosions against the end of said second cylinder, the cycle of movement of said second cylinder including axial movement relative to the first cylinder substantially in accordance with the law of sines, and such movement during the explosion period of the engine being at the steepest part of the time curve expressing such law.

12. In an internal combustion engine, the combination of a fixed cylinder provided with inlet and exhaust ports, a head fixed to said cylinder, a second cylinder slidable within said first cylinder, the space between the end of said second cylinder and said head communicating with the space within said second cylinder, a piston working within said second cylinder, a crank shaft to which said piston is connected, means operatively connecting said second cylinder with said crank shaft for constraining the former to move in a definite cycle relative to the movements of the piston and for transmitting to said crank shaft the force of explosions against the end of said second cylinder, the cycle of movement of said second cylinder including axial movement relative to the first cylinder, and such movement during the explosion period of the engine being at the most rapid part of such axial movement.

13. In an internal combustion engine, a cylinder, a piston reciprocable therein in a four-stroke cycle, a second piston reciprocable in said cylinder and connected to said first piston so as to make one-half the number of reciprocations of the latter, both of said pistons being exposed to the axial force of explosions in the cylinder, and inlet and exhaust conduits, said second piston having portions which as said second piston is moved produce both the opening and the closing of both the inlet and the exhaust conduits.

14. In an internal combustion engine, the combination of a fixed cylinder provided with inlet and exhaust ports, a head fixed to said cylinder, a second cylinder slidable within said first cylinder, the space between the end of said second cylinder and said head communicating with the space within said second cylinder, a piston working within said second cylinder, a crank shaft to which said piston is connected, and means operatively connecting said second cylinder with said crank shaft for constraining the former to move in a definite cycle relative to the movements of the piston and for transmitting to said crank shaft the force of explosions against the end of said second cylinder, the cycle of movement of said second cylinder including both axial and circumferential movement relative to said first cylinder and the movement of the second cylinder controlling the opening and closing of the inlet and exhaust ports in said first cylinder.

15. An internal combustion engine, comprising a cylinder, a main piston reciprocable therein, a supplementary piston interposed between the main piston and the cylinder and also reciprocable in said cylinder, said second piston being geared to the main piston to make one complete reciprocation for two complete reciprocations of the main piston, said cylinder being provided with inlet and exhaust ports and said supplementary piston being provided with portions which cover and uncover such inlet and exhaust ports as such supplementary piston is moved and which form the sole controlling means for such inlet and exhaust ports, and the end surface of said supplementary piston being open to the space within the cylinder so that said supplementary piston as well as the main piston is acted on by the force of the explosion within the cylinder.

16. An internal combustion engine, comprising a cylinder, a main piston reciprocable therein, a supplementary piston also reciprocable in said cylinder, said second piston being geared to the main piston to make one complete reciprocation for two complete reciprocations of the main piston, said cylinder being provided with inlet and exhaust ports and said supplementary piston being provided with portions which cover and uncover such inlet and exhaust ports as such supplementary piston is moved and which form the sole controlling means for such inlet and exhaust ports, and the end surface of said supplementary piston being open to the space within the cylinder so that said supplementary piston as well as the main piston is acted on by the force of explosion within the cylinder.

17. The combination of a crank case, a crank shaft, a main piston, a connecting rod, a cylinder, a hollow piston surrounding the main piston and means for allowing both to go down during the working stroke transmitting power to both the crank shaft and countershaft, and means for reciprocating and oscillating the hollow piston during its cycle so that the ports will register with the ports in cylinder.

In witness whereof, I have hereunto set my hand at Indianapolis, Indiana, this tenth day of February, A. D. one thousand nine hundred and fourteen.

JULES HALTENBERGER.

Witnesses:
  FRANK A. FAHLE,
  G. B. SCHLEY.